United States Patent
Matsubara et al.

(10) Patent No.: US 12,183,878 B2
(45) Date of Patent: Dec. 31, 2024

(54) METHOD OF MANUFACTURING SULFIDE-BASED INORGANIC SOLID ELECTROLYTE MATERIAL

(71) Applicant: FURUKAWA CO., LTD., Tokyo (JP)

(72) Inventors: Tetsuya Matsubara, Tsukuba (JP); Tatsushi Yoshida, Tsukuba (JP); Motoshi Tamura, Tsukuba (JP); Kazutomi Yamamoto, Tsukuba (JP)

(73) Assignee: FURUKAWA CO., LTD., Tokyo (JP)

( * ) Notice: Subject to any disclaimer, the term of this patent is extended or adjusted under 35 U.S.C. 154(b) by 649 days.

(21) Appl. No.: 17/598,634

(22) PCT Filed: Mar. 6, 2020

(86) PCT No.: PCT/JP2020/009708
§ 371 (c)(1),
(2) Date: Sep. 27, 2021

(87) PCT Pub. No.: WO2020/203047
PCT Pub. Date: Oct. 8, 2020

(65) Prior Publication Data
US 2022/0085406 A1 Mar. 17, 2022

(30) Foreign Application Priority Data

Mar. 29, 2019 (JP) .................................. 2019-066565

(51) Int. Cl.
*H01M 10/0562* (2010.01)
*C03C 4/14* (2006.01)
*C03C 10/00* (2006.01)

(52) U.S. Cl.
CPC ........... *H01M 10/0562* (2013.01); *C03C 4/14* (2013.01); *C03C 10/00* (2013.01); *C03C 2204/00* (2013.01); *H01M 2300/0068* (2013.01)

(58) Field of Classification Search
CPC ...... H10M 10/0562; H10M 2300/0068; C03C 4/14; C03C 10/00; C03C 2204/00
See application file for complete search history.

(56) References Cited

U.S. PATENT DOCUMENTS

| 8,962,194 | B2 | 2/2015 | Senga et al. | |
|---|---|---|---|---|
| 10,461,363 | B2 | 10/2019 | Kanno et al. | |
| 2007/0160911 | A1 | 7/2007 | Senga et al. | |
| 2010/0151335 | A1* | 6/2010 | Senga ................ | H01M 10/052 429/322 |
| 2013/0097854 | A1* | 4/2013 | Kato .................. | H01M 10/052 429/305 |
| 2017/0155168 | A1 | 6/2017 | Kanno et al. | |
| 2017/0162901 | A1* | 6/2017 | Chen ................ | H01M 10/0562 |

FOREIGN PATENT DOCUMENTS

| CN | 1918668 A | 2/2007 |
|---|---|---|
| CN | 109244549 A | 1/2019 |
| EP | 3182496 A1 | 6/2017 |
| JP | 2008-120666 A | 5/2008 |
| JP | 2014-220051 A | 11/2014 |
| JP | 2015-76181 A | 4/2015 |
| JP | 2016-27545 A | 2/2016 |
| JP | 2017-91810 A | 5/2017 |

OTHER PUBLICATIONS

International Search Report (ISR) dated Jun. 9, 2020 filed in PCT/JP2020/009708.
Office Action dated Nov. 24, 2022, issued in counterpart CN Application No. 202080023463.3. (6 pages).
The Extended European Search Report dated Dec. 7, 2022, issued in counterpart EP Application No. 20785195.7. (6 pages).

* cited by examiner

*Primary Examiner* — C Melissa Koslow
(74) *Attorney, Agent, or Firm* — WHDA, LLP

(57) ABSTRACT

Provided is a method of manufacturing a sulfide-based inorganic solid electrolyte material including Li, P, and S as constituent elements, the method including: a preparation step of preparing a raw material inorganic composition (A) including at least lithium sulfide, phosphorus sulfide, and a crystal nucleating agent; and a vitrification step of mechanically processing the raw material inorganic composition (A) to vitrify the raw material inorganic composition (A).

6 Claims, No Drawings

METHOD OF MANUFACTURING SULFIDE-BASED INORGANIC SOLID ELECTROLYTE MATERIAL

TECHNICAL FIELD

The present invention relates to a method of manufacturing a sulfide-based inorganic solid electrolyte material.

BACKGROUND ART

In general, a lithium ion battery is used as a power supply of a small mobile device such as a mobile phone or a laptop. In addition, recently, the lithium ion battery has been used not only as a power supply of a small mobile device but also as a power supply of an electric vehicle, an electric power storage, or the like.

In a currently available lithium ion battery, an electrolytic solution including a combustible organic solvent is used. On the other hand, in a lithium ion battery (hereinafter, also referred to as "all-solid-state lithium ion battery") in which a solid electrolyte is replaced with the electrolytic solution such that the entire battery is made of a solid, a combustible organic solvent is not used in the battery. Therefore, it is considered that a safety device can be simplified and manufacturing costs or productivity is excellent. As a solid electrolyte material used for the solid electrolyte, for example, a sulfide-based solid electrolyte material is known.

For example, Patent Document 1 (Japanese Unexamined Patent Publication No. 2016-27545) describes a sulfide-based solid electrolyte material having a peak at a position of 2θ=29.86°±1.00° in X-ray diffraction measurement using a CuKα ray and a composition of $Li_{2y+3}PS_4$ (0.1≤y≤0.175).

RELATED DOCUMENT

Patent Document

[Patent Document 1] Japanese Unexamined Patent Publication No. 2016-27545

SUMMARY OF THE INVENTION

Technical Problem

In general, the sulfide-based inorganic solid electrolyte material described in Patent Document 1 can be obtained through a step of mechanically processing a raw material inorganic composition including two or more inorganic compounds as raw materials of the inorganic solid electrolyte material using a method such as a mechanical milling method to vitrify the raw material inorganic composition.

However, according to an investigation by the present inventors, it was clarified that a very long period of time is required for the step of mechanically processing the raw material inorganic composition to vitrify the raw material inorganic composition such that the productivity deteriorates. That is, the method of manufacturing the sulfide-based inorganic solid electrolyte material including the step of mechanically processing the above-described raw material inorganic composition to vitrify the raw material inorganic composition is not suitable for the industrial production.

The present invention has been made in consideration of the above-described circumstances, and an object thereof is to provide a method of manufacturing a sulfide-based inorganic solid electrolyte material in which the vitrification step can be performed within a shorter period of time such that the manufacturing time can be reduced.

Solution to Problem

The present inventors conducted a thorough investigation in order to achieve the above-described object. As a result, the present inventors found that the step of vitrifying the inorganic composition can be reduced by performing the vitrification step after containing a crystal nucleating agent in the raw material inorganic composition before the vitrification step, thereby completing the present invention.

According to the present invention, there is provided a method of manufacturing a sulfide-based inorganic solid electrolyte material including Li, P, and S as constituent elements, the method including:

a preparation step of preparing a raw material inorganic composition (A) including at least lithium sulfide, phosphorus sulfide, and a crystal nucleating agent; and a vitrification step of mechanically processing the raw material inorganic composition (A) to vitrify the raw material inorganic composition (A).

Advantageous Effects of Invention

According to the present invention, it is possible to provide a method of manufacturing a sulfide-based inorganic solid electrolyte material in which the vitrification step can be performed within a shorter period of time such that the manufacturing time can be reduced.

DESCRIPTION OF EMBODIMENTS

Hereinafter, an embodiment of the present invention will be described. Unless specified otherwise, a numerical range "A to B" represents A or more and B or less.

First, a method of manufacturing the sulfide-based inorganic solid electrolyte material according to the present embodiment will be described.

The method of manufacturing the sulfide-based inorganic solid electrolyte material according to the present embodiment is a method of manufacturing a sulfide-based inorganic solid electrolyte material including Li, P, and S as constituent elements, the method including: a preparation step of preparing a raw material inorganic composition (A) including at least lithium sulfide, phosphorus sulfide, and a crystal nucleating agent; and a vitrification step of mechanically processing the raw material inorganic composition (A) to vitrify the raw material inorganic composition (A).

In the method of manufacturing the sulfide-based inorganic solid electrolyte material according to the present embodiment, the time required for the step of vitrifying the inorganic composition can be reduced as compared to a manufacturing method in the related art. As a result, the manufacturing time of the sulfide-based inorganic solid electrolyte material according to the present embodiment can be reduced.

The sulfide-based inorganic solid electrolyte material obtained using the method of manufacturing the sulfide-based inorganic solid electrolyte material according to the present embodiment includes Li, P, and S as constituent elements.

In addition, in the sulfide-based inorganic solid electrolyte material according to the present embodiment, from the viewpoint of further improving the lithium ionic conductivity, the electrochemical stability, and the stability and the handling properties in water or air, a molar ratio (Li/P) of a content of Li to a content of P in the sulfide-based inorganic solid electrolyte material is preferably 1.0 or higher and 10.0 or lower, more preferably 1.0 or higher and 5.0 or lower, still more preferably 2.0 or higher and 4.5 or lower, still more preferably 3.0 or higher and 4.2 or lower, still more preferably 3.3 or higher and 4.0 or lower, and particularly preferably 3.3 or higher and 3.8 or lower.

In addition, a molar ratio S/P of a content of S to the content of P is preferably 1.0 or higher and 10.0 or lower, more preferably 2.0 or higher and 6.0 or lower, still more preferably 3.0 or higher and 5.0 or lower, still more preferably 3.5 or higher and 4.5 or lower, and particularly preferably 3.8 or higher and 4.2 or lower.

Here, the contents of Li, P, and S in the sulfide-based inorganic solid electrolyte material according to the present embodiment can be obtained by, for example, ICP Emission Spectroscopy or X-ray analysis.

The sulfide-based inorganic solid electrolyte material according to the present embodiment can be used for any application where lithium ionic conductivity is required. In particular, it is preferable that the sulfide-based inorganic solid electrolyte material according to the present embodiment is used for a lithium ion battery. More specifically, the sulfide-based inorganic solid electrolyte material according to the present embodiment is used for a positive electrode active material layer, a negative electrode active material layer, an electrolyte layer, or the like in a lithium ion battery. Further, the sulfide-based inorganic solid electrolyte material according to present embodiment is suitably used for a positive electrode active material layer, a negative electrode active material layer, a solid electrolyte layer, or the like forming an all-solid-state lithium ion battery, and is more suitably used for a solid electrolyte layer forming an all-solid-state lithium ion battery.

Examples of the all-solid-state lithium ion battery to which the sulfide-based inorganic solid electrolyte material according to the present embodiment is applied include an all-solid-state lithium ion battery in which a positive electrode, a solid electrolyte layer, and a negative electrode are stacked in this order.

Hereinafter, each of the steps will be described in detail.
(Preparation Step)

First, a raw material inorganic composition (A) including at least lithium sulfide, phosphorus sulfide, and a crystal nucleating agent is prepared. The raw material inorganic composition (A) can be obtained, for example, by mixing the respective raw materials at a predetermined molar ratio such that the target sulfide-based inorganic solid electrolyte material has a desired composition ratio.

Here, a mixing ratio between the respective raw materials in the raw material inorganic composition (A) is adjusted such that the obtained sulfide-based inorganic solid electrolyte material has a desired composition ratio.

A method of mixing the respective raw materials is not particularly limited as long as it is a mixing method capable of uniformly mixing the respective raw materials. For example, the raw materials can be mixed using a ball mill, a beads mill, a vibrating mill, an impact crushing device, a mixer (for example, a pug mixer, a ribbon mixer, a tumbler mixer, a drum mixer, or a V-type mixer), a kneader, a twin-screw kneader, an air flow grinder, or the like.

Mixing conditions such as a stirring rate, a processing time, a temperature, a reaction pressure, or a gravitational acceleration applied to the mixture during the mixing of the respective raw materials can be appropriately determined based on the amount of the mixture processed.

The lithium sulfide used as a raw material is not particularly limited, and a commercially available lithium sulfide may be used. For example, lithium sulfide obtained by reaction of lithium hydroxide and hydrogen sulfide may also be used. From the viewpoint of obtaining the high-purity sulfide-based inorganic solid electrolyte material and suppressing a side reaction, it is preferable that lithium sulfide having little impurities is used.

Here, in the present embodiment, examples of the lithium sulfide include lithium polysulfide. As the lithium sulfide, $Li_2S$ is preferable.

The phosphorus sulfide used as a raw material is not particularly limited. For example, commercially available phosphorus sulfide (for example, $P_2S_5$, $P_4S_3$, $P_4S_7$, or $P_4S_5$) can be used. From the viewpoint of obtaining the high-purity sulfide-based inorganic solid electrolyte material and suppressing a side reaction, it is preferable that phosphorus sulfide having little impurities is used. As the phosphorus sulfide, $P_2S_5$ is preferable.

As the crystal nucleating agent used as the raw material, for example, an inorganic solid electrolyte material can be used.

The inorganic solid electrolyte material is not particularly limited, and examples thereof include a sulfide-based inorganic solid electrolyte material, an oxide-based inorganic solid electrolyte material, and other lithium-based inorganic solid electrolyte materials. Among these, from the viewpoint that the ionic conductivity of the obtained sulfide-based inorganic solid electrolyte material can be further improved, a sulfide-based inorganic solid electrolyte material is preferable as the crystal nucleating agent used as the raw material, and a sulfide-based inorganic solid electrolyte material including Li, P, and S as constituent elements is more preferable.

In addition, the inorganic solid electrolyte material is not particularly limited, and examples thereof include an inorganic solid electrolyte material used for a solid electrolyte layer forming an all-solid-state lithium ion battery.

Examples of the sulfide-based inorganic solid electrolyte material include a $Li_2S$—$P_2S_5$ material, a $Li_2S$—$SiS_2$ material, a $Li_2S$—$GeS_2$ material, a $Li_2S$—$Al_2S_3$ material, a $Li_2S$—$SiS_2$—$Li_3PO_4$ material, a $Li_2S$—$P_2S_5$—$GeS_2$ material, a $Li_2S$—$Li_2O$—$P_2S_5$—$SiS_2$ material, a $Li_2S$—$GeS_2$—$P_2S_5$—$SiS_2$ material, a $Li_2S$—$SnS_2$—$P_2S_5$—$SiS_2$ material, a $Li_2S$—$P_2S_5$—$Li_3N$ material, a $Li_2S_{2+x}$—$P_4S_3$ material, and a $Li_2S$—$P_2S_5$—$P_4S_3$ material.

Among these, the $Li_2S$—$P_2S_5$ material is preferable from the viewpoint that it has excellent lithium ionic conductivity and has stability to the extent that decomposition or the like does not occur in a wide voltage range. Here, for example, the $Li_2S$—$P_2S_5$ material refers to an inorganic material obtained by a chemical reaction caused by mechanically processing an inorganic composition including at least $Li_2S$ (lithium sulfide) and $P_2S_5$ (phosphorus sulfide).

Here, in the present embodiment, examples of the lithium sulfide include lithium polysulfide.

Examples of the oxide-based inorganic solid electrolyte material include: a NASICON type such as $LiTi_2(PO_4)_3$, $LiZr_2(PO_4)_3$, or $LiGe_2(PO_4)_3$, a perovskite type such as $(La_{0.5+x}Li_{0.5-3x})TiO_3$; a $Li_2O$—$P_2O_5$ material; and a $Li_2O$—$P_2O_5$—$Li_3N$ material.

Examples of the other lithium-based inorganic solid electrolyte material include LiPON, $LiNbO_3$, $LiTaO_3$, $Li_3PO_4$, $LiPO_{4-x}N_x$ (x satisfies $0<x\leq1$), LiN, LiI, and LISICON.

Further, a glass ceramic obtained by precipitating crystal of the inorganic solid electrolyte materials can also be used as the inorganic solid electrolyte material.

It is preferable that the sulfide-based inorganic solid electrolyte material used as the crystal nucleating agent has lithium ionic conductivity and includes Li, P, and S as constituent elements.

In addition, in the sulfide-based inorganic solid electrolyte material used as the crystal nucleating agent, from the viewpoint of further improving the lithium ionic conductivity, the electrochemical stability, the stability and the handling properties in water or air, and the like, of the obtained sulfide-based inorganic solid electrolyte material, a molar ratio Li/P of a content of Li to a content of P in the sulfide-based inorganic solid electrolyte material is preferably 1.0 or higher and 10.0 or lower, more preferably 1.0 or higher and 5.0 or lower, still more preferably 2.0 or higher and 4.5 or lower, still more preferably 3.0 or higher and 4.2 or lower, still more preferably 3.3 or higher and 4.0 or lower, and particularly preferably 3.3 or higher and 3.8 or lower.

In addition, a molar ratio S/P of a content of S to the content of P is preferably 1.0 or higher and 10.0 or lower, more preferably 2.0 or higher and 6.0 or lower, still more preferably 3.0 or higher and 5.0 or lower, still more preferably 3.5 or higher and 4.5 or lower, and particularly preferably 3.8 or higher and 4.2 or lower.

Here, the contents of Li, P, and S in the sulfide-based inorganic solid electrolyte material used as the crystal nucleating agent can be obtained by, for example, ICP Emission Spectroscopy or X-ray photoelectron spectroscopy.

Examples of the shape of the inorganic solid electrolyte material used as the crystal nucleating agent include a particle shape. The inorganic solid electrolyte material having a particle shape is not particularly limited, and an average particle size $d_{50}$ in a weight average particle size distribution measured using a laser diffraction scattering particle size distribution method is preferably 1 μm or more and 50 μm or less, more preferably 2 μm or more and 40 μm or less, still more preferably 3 μm or more and 35 μm or less.

From the viewpoint of further reducing the period of time required for the vitrification step, the content of the crystal nucleating agent in the raw material inorganic composition (A) is preferably 5 mass % or higher, more preferably 10 mass % or higher, still more preferably 15 mass % or higher, still more preferably 20 mass % or higher, and particularly preferably 25 mass % or higher with respect to 100 mass % of the total mass of the raw material inorganic composition (A). From the viewpoint of reducing the amount of the crystal nucleating agent used and increasing the amount of the obtained sulfide-based inorganic solid electrolyte material manufactured, the upper limit of the content of the crystal nucleating agent in the raw material inorganic composition (A) is preferably 60 mass % or lower, more preferably 50 mass % or lower, still more preferably 45 mass % or lower, and particularly preferably 35 mass % or lower.

Lithium nitride may be further used as a raw material. Here, nitrogen in the lithium nitride is discharged into the system as $N_2$. Therefore, by using lithium nitride an inorganic compound that is a raw material, only the Li composition can be increased with respect to the sulfide-based inorganic solid electrolyte material including Li, P, and S as constituent elements.

The lithium nitride according to the present embodiment is not particularly limited, and a commercially available lithium nitride (for example, $Li_3N$) may be used. For example, lithium nitride obtained by reaction of metallic lithium (for example, Li foil) and nitrogen gas may also be used. From the viewpoint of obtaining the high-purity solid electrolyte material and suppressing a side reaction, it is preferable that lithium nitride having little impurities is used.

(Vitrification Step)

Next, the raw material inorganic composition (A) is mechanically processed to vitrify the raw material inorganic composition (A). That is, the sulfide-based inorganic solid electrolyte material in the vitreous state can be obtained by vitrifying lithium sulfide and phosphorus sulfide as raw materials in a chemical reaction.

Here, the mechanical process refers to a process of causing two or more kinds of inorganic compounds to mechanically collide with each other to be vitrified in a chemical reaction, for example, a mechanochemical process.

In addition, from the viewpoint of realizing an environment where water or oxygen is removed at a high level in the vitrification step, it is preferable that the mechanical process is performed in a dry condition, and it is more preferable that the mechanical process is a dry mechanochemical process.

By using the mechanochemical process, the respective raw materials can be mixed while crushing the raw materials into fine particles. Therefore, the contact area of the respective raw materials can be increased. As a result, the reaction of the respective raw materials can be accelerated. The sulfide-based inorganic solid electrolyte material according to the present embodiment can be obtained with higher efficiency.

Here, the mechanochemical process refers to a method of vitrifying a target composition while applying a mechanical energy such as a shear force, an impact force, or a centrifugal force thereto. Examples of a device for performing the vitrification through the mechanochemical process include: a crusher and disperser such as a ball mill, a beads mill, a vibrating mill, a turbo mill, a mechano-fusion, a disc mill, or a roll mill; a rotation and impact crushing device including a mechanism as a combination of rotation (shearing stress) and impact (compressive stress) represented by a rock drill, a vibration drill, or an impact driver, or the like; and a high-pressure grinding roll. In particular, from the viewpoint of efficiently generating a very high impact energy, a ball mill or a beads mill is preferable, and a ball mill is more preferable. In addition, from the viewpoint of obtaining excellent continuous productivity, for example, a roll mill; a rotation and impact crushing device including a mechanism as a combination of rotation (shearing stress) and impact (compressive stress) represented by a rock drill, a vibration drill, or an impact driver; or a high-pressure grinding roll is preferable.

In addition, it is preferable that the mechanochemical process is performed in an inert atmosphere. As a result, a reaction of the sulfide-based inorganic solid electrolyte material with water vapor, oxygen, or the like can be suppressed.

In addition, the inert atmosphere refers to a vacuum atmosphere or an inert gas atmosphere. In the inert atmosphere, in order to avoid contact with water, the dew point is preferably −50° C. or lower and more preferably −60° C. or lower. The inert gas atmosphere refers to an atmosphere of inert gas such as argon gas, helium gas, or nitrogen gas. In order to prevent impurities from being mixed in a product, it is preferable that the purity of the inert gas is as high as possible. A method of introducing the inert gas into the mixed system is not particularly limited as long as it is a method capable of filling the mixed system with the inert gas atmosphere. Examples of the introduction method include a method of purging inert gas and a method continuously introducing inert gas at a given flow rate.

Mixing conditions such as a rotation speed, a processing time, a temperature, a reaction pressure, or a gravitational acceleration applied to the raw material inorganic composition (A) during the mechanical process of the raw material inorganic composition (A) can be appropriately determined based on the kind of the raw material inorganic composition (A) or the amount thereof processed. In general, as the rotation speed increases, the glass production rate increases, and as the processing time increases, the glass conversion rate increases.

Typically, when X-ray diffraction analysis is performed using CuKα rays as a radiation source, if a diffraction peak derived from the raw material is lost or decreases, it can be determined that the raw material inorganic composition (A) is vitrified and a desired sulfide-based inorganic solid electrolyte material is obtained.

Here, in the step of vitrifying the raw material inorganic composition (A), it is preferable that the mechanical process is performed until the lithium ionic conductivity measured using an alternating current impedance method under measurement conditions of 27.0° C., an applied voltage of 10 mV, and a measurement frequency range of 0.1 Hz to 7 MHz is preferably $0.5 \times 10^{-4}$ S·cm$^{-1}$ or higher and preferably $1.0 \times 10^{-4}$ S·cm$^{-1}$ or higher. As a result, a sulfide-based inorganic solid electrolyte material having further improved lithium ionic conductivity can be obtained.

(Crystallization Step)

In the method of manufacturing the sulfide-based inorganic solid electrolyte material according to the present embodiment, from the viewpoint of further improving the lithium ionic conductivity of the obtained sulfide-based inorganic solid electrolyte material, is more preferable to perform a crystallization step of heating a sulfide-based inorganic solid electrolyte material obtained after the vitrification step (the sulfide-based inorganic solid electrolyte material in the vitreous state after the vitrification step will also be referred to as "inorganic composition (B)") to crystallize at least a part of the inorganic composition (B). By heating the obtained inorganic composition (B) to crystalize at least a part of the inorganic composition (B), the sulfide-based inorganic solid electrolyte material in a glass ceramic state (also referred to as "crystallized glass") can be obtained. As a result, for example, a sulfide-based inorganic solid electrolyte material having further improved lithium ionic conductivity can be obtained.

That is, from the viewpoint of obtaining excellent lithium ionic conductivity, it is preferable that the sulfide-based inorganic solid electrolyte material according to the present embodiment is in the glass ceramic state (crystallized glass state).

The temperature at which the inorganic composition (B) is heated is not particularly limited as long as it is a temperature at which crystallization can be sufficiently accelerated. For example, from the viewpoint of effectively accelerating crystallization while suppressing thermal decomposition or the like of the inorganic composition (B), the temperature is preferably in a range of 220° C. or higher and 500° C. or lower, more preferably in a range of 250° C. or higher and 400° C. or lower, still more preferably in a range of 260° C. or higher and 350° C. or lower, and particularly preferably in a range of 270° C. or higher and 350° C. or lower.

The time for which the inorganic composition (B) is heated is not particularly limited as long as it is the time for which the desired sulfide-based inorganic solid electrolyte material in the glass ceramic state can be obtained. For example, the time is in a range of 1 hour or longer and 24 hours or shorter, preferably 0.5 hours or longer and 8 hours or shorter, and more preferably 1 hour or longer and 3 hours or shorter. A heating method is not particularly limited, and examples thereof include a method using a calcination furnace. Conditions such as a temperature or a time during heating can be appropriately adjusted in order to optimize properties of the sulfide-based inorganic solid electrolyte material.

In addition, it is preferable that the inorganic composition (B) is heated, for example, in an inert gas atmosphere. As a result, deterioration (for example, oxidation) of the inorganic composition (B) can be prevented.

Examples of the inert gas when the inorganic composition (B) is heated include argon gas, helium gas, and nitrogen gas. In order to prevent impurities from being mixed in a product, it is preferable that the purity of the inert gas is as high as possible. In addition, in order to avoid contact with water, the dew point is preferably −50° C. or lower and more preferably −60° C. or lower. A method of introducing the inert gas into the mixed system is not particularly limited as long as it is a method capable of filling the mixed system with the inert gas atmosphere. Examples of the introduction method include a method of purging inert gas and a method continuously introducing inert gas at a given flow rate.

(Heating Step)

In the method of manufacturing the sulfide-based inorganic solid electrolyte material according to the present embodiment, a step of heating the raw material inorganic composition (A) prepared in the preparation step is further performed between the preparation step and the vitrification step.

That is, the vitrification step may be performed on the heated raw material inorganic composition (A).

By performing the heating step before the vitrification step, the time required for the step of vitrifying the raw material inorganic composition (A) can be reduced. As a result the manufacturing time of the sulfide-based inorganic solid electrolyte material can be further reduced. The reason for this is not clear but is presumed to be as follows.

First, an inorganic composition in the vitreous state is in a metastable state. On the other hand, an inorganic composition in a crystalline state is in a stable state. In addition, when an inorganic composition including two or more inorganic compounds is heated, an energy higher than an activation energy can be simply applied. Therefore, an inorganic composition in a crystalline state that is a lower energy state can be obtained together with the discharge of the energy. Since the free energy in the stable state is close to the free energy in the metastable state, the inorganic composition can be made to enter the vitreous state as the metastable state from the crystalline state as the stable state with a lower energy.

Due to the above-descried reason, it is presumed that, by performing the step of heating the raw material inorganic composition (A) before the step of vitrifying the raw material inorganic composition (A) such that the raw material inorganic composition (A) enters the crystalline state as the stable state in advance, the inorganic composition can be made enter the vitreous state as the metastable state with a lower energy, and the time required for the step of vitrifying the raw material inorganic composition (A) can be significantly reduced.

The temperature at which the raw material inorganic composition (A) is heated is not particularly limited, and can be appropriately set depending on the sulfide-based inorganic solid electrolyte material to be formed.

For example, the heating temperature is preferably in a range of 200° C. or higher and 400° C. or lower and more preferably in a range of 220° C. or higher and 300° C. or lower.

The time for which the raw material inorganic composition (A) is heated is not particularly limited. For example, the time is in a range of 1 minute or longer and 24 hours or shorter and preferably 0.1 hours or longer and 10 hours or shorter. A heating method is not particularly limited, and examples thereof include a method using a calcination furnace. Conditions such as a temperature or a time during heating can be appropriately adjusted in order to optimize properties of the sulfide-based inorganic solid electrolyte material according to the present embodiment.

In addition, whether or not the raw material, inorganic composition (A) is crystallized can be determined based on, for example, whether or not a new crystal peak is formed in a spectrum obtained by X-ray diffraction in which a CuKα ray is used as a radiation source.

(Step of Crushing, Classifying, or Granulating)

In the method of manufacturing the sulfide-based inorganic solid electrolyte material according to the present embodiment, optionally, the step of crushing, classifying, or granulating the obtained sulfide-based inorganic solid electrolyte material may be further performed. For example, by crushing the sulfide-based inorganic solid electrolyte material into fine particles and adjusting the particle size thereof through a classification operation or a granulation operation, a sulfide-based inorganic solid electrolyte material having a desired particle size can be obtained. The above-described crushing method is not particularly limited, and a well-known crushing method such as a mixer, air flow crushing, a mortar, a tumbling mill, or a coffee mill can be used. In addition, the above-described classification method is not particularly limited, and a well-known method such as a sieve can be used.

From the viewpoint of avoiding contact with water in air, it is preferable that crushing or classification is performed in an inert gas atmosphere or a vacuum atmosphere.

In order to obtain the sulfide-based inorganic solid electrolyte material according to the present embodiment, it is important to appropriately adjust the respective steps. The method of manufacturing the sulfide-based inorganic solid electrolyte material according to the present embodiment is not limited to the above-described method. By appropriately adjusting various conditions, the sulfide-based inorganic solid electrolyte material according to the present embodiment can be obtained.

Hereinafter, the embodiment of the present invention has been described. However, the embodiment is merely an example of the present invention, and various configurations other than the above-described configurations can also be adopted.

In addition, the present invention is not limited to the above-described embodiments, and modifications, improvements, and the like within a range where the object of the present invention can be achieved are included in the present invention.

EXAMPLES

Hereinafter, the present invention will be described in more detail using Examples and Comparative Examples. However, the present invention is not limited to these Examples and Comparative Examples.
<Evaluation Method>

First, an evaluation method in the following Examples and Comparative Examples will be described.
(1) Measurement of Lithium Ionic Conductivity In each of the sulfide-based inorganic solid electrolyte material obtained in each of Examples and Comparative Examples, the lithium ionic conductivity was measured using an alternating current impedance method.

For the measurement of the lithium ionic conductivity, a potentiostat/galvanostat SP-300 (manufactured by Bio-Logic Sciences Instruments) was used. The size of the sample was diameter: 9.5 mm and thickness: 1.2, 2.0 mm. Measurement conditions were applied voltage: 10 mV, measurement temperature: 27.0° C., and measurement frequency range: 0.1 Hz to 7 MHz, and electrode: Li foil.

Here, 150 mg of the powdery sulfide-based inorganic solid electrolyte material obtained in each of Examples and Comparative Examples was pressed using a press machine at 270 MPa for 10 minutes, and the plate-shaped sulfide-based inorganic solid electrolyte material having a diameter of 9.5 mm and a thickness of 1.2 to 2.0 mm was obtained and used as the sample for the measurement of the lithium ionic conductivity.

Example 1

(1) Preparation of Sulfide-Based Inorganic Solid Electrolyte Material 1 for Crystal Nucleating Agent A sulfide-based inorganic solid electrolyte material 1 for a crystal nucleating agent was prepared according to the following procedure.

Regarding the raw materials, $Li_2S$ (manufactured by Furukawa Co., Ltd., purity: 99.9%), $P_2S_5$ manufactured by Kanto Chemical Co., Inc.), and $Li_3N$ (manufactured by Furukawa Co., Ltd.) were used.

Next, in an argon glove box, $Li_2S$ powder, $P_2S_5$ powder, and Li powder were weighed ($Li_2S:P_2S:Li_3N=27:9:2$ (molar ratio)), and all the powders were mixed in an agate mortar for 10 minutes.

Next, 1 g of the mixed powder was weighed, was put into a zirconia pot (inner volume: 45 mL) with 18 zirconia balls having a diameter ϕ of 10 mm, and was crushed and mixed using a planetary ball mill (rotation: 800 rpm, revolution: 400 rpm) for 30 hours. As a result, the sulfide-based inorganic solid electrolyte material ($Li_{10}P_3S_{12}$) in the vitreous state was obtained.

Next, the sulfide-based inorganic solid electrolyte material in the vitreous state was annealed in argon at 290° C. for 2 hours. As a result the sulfide-based inorganic solid electrolyte material ($Li_{10}P_3S_{12}$) in the glass ceramic state was obtained. Next, the obtained sulfide-based inorganic solid electrolyte material in the glass ceramic state is crushed and mixed using a planetary ball mill (rotation: 800 rpm, revolution: 400 rpm) for 30 hours and was vitrified again. As a result, the sulfide-based inorganic solid electrolyte material 1 for the crystal nucleating agent was obtained.

(2) Preparation of Target Sulfide-Based Inorganic Solid Electrolyte Material

The target sulfide-based inorganic solid electrolyte material was prepared according to the following procedure.

Regarding the raw materials, $Li_2S$ (manufactured by Furukawa Co., Ltd., purity: 99.9%), $P_2S_5$ (manufactured by Kanto Chemical Co., Inc.), and $Li_3N$ (manufactured by Furukawa Co., Ltd.) were used.

Next, in an argon glove box, $Li_2S$ powder, $P_2S_5$ powder, and $Li_3N$ powder were weighed ($Li_2S:P_2S_5:Li_3N=27:9:2$ (molar ratio)), the sulfide-based inorganic solid electrolyte material 1 for the crystal nucleating agent was weighed such that the content thereof was as shown in Table 1 with respect to the raw material powders, and all the powders were mixed in an agate mortar for 10 minutes.

Next, 1 g of the mixed powder (raw material inorganic composition (A)) was weighed, was put into a zirconia pot (inner volume: 45 mL) with 18 zirconia balls having a diameter ϕ of 10 mm, and was crushed and mixed (mechanochemical process) using a planetary ball mill (rotation: 800 rpm, revolution: 400 rpm) for 3 hours. As a result, the sulfide-based inorganic solid electrolyte material ($Li_{10}P_3S_{12}$) in the vitreous state was obtained.

Next, the sulfide-based inorganic solid electrolyte material in the vitreous state was annealed in argon at 290° C. for 2 hours. As a result, the sulfide-based inorganic solid electrolyte material ($Li_{10}P_3S_{12}$) in the glass ceramic state was obtained.

The lithium ionic conductivity of each of the obtained sulfide-based inorganic solid electrolyte materials in the vitreous state and the obtained sulfide-based inorganic solid electrolyte materials in the class ceramic state was measured. The obtained results are shown in Table 1.

Examples 2 to 4 and Comparative Example 1

Sulfide-based inorganic solid electrolyte materials in the vitreous state and sulfide-based inorganic solid electrolyte materials ($Li_{10}P_3S_{12}$) in the glass ceramic state were prepared using the same method as that of Example 1, except that the content of the sulfide-based inorganic solid electrolyte material 1 for the crystal nucleating agent was changed as shown in Table 1. The lithium ionic conductivity of each of the obtained sulfide-based inorganic solid electrolyte materials in the vitreous state and the obtained sulfide-based inorganic solid electrolyte materials in the glass ceramic state was measured. The obtained results are shown in Table 1.

Examples 10 and 11 and Comparative Examples 2 and 3

(1) Preparation of Sulfide-Based inorganic Solid Electrolyte Material 2 for Crystal Nucleating Agent A sulfide-based inorganic solid electrolyte material 2 for a crystal nucleating agent was prepared using the same method as that of the sulfide-based inorganic solid electrolyte material 1 for the crystal nucleating agent, except that the mixing ratio between the respective raw materials was adjusted such that the composition was $Li_3PS_4$.

(2) Preparation of Target Sulfide-Based Inorganic Solid Electrolyte Material

Sulfide-based inorganic solid electrolyte materials in the vitreous state and sulfide-based inorganic solid electrolyte materials ($Li_3PS_4$) in the glass ceramic state were prepared using the same method as that of Example 1, except that the mixing ratio between the respective raw materials was adjusted such that the composition was $Li_3PS_4$, time of the mechanochemical process by the planetary ball mill was changed as shown in Table 1, and the kind and the content of the sulfide-based inorganic solid electrolyte material for the crystal nucleating agent were changed as shown in Table 1. The lithium ionic conductivity of each of the obtained sulfide-based inorganic solid electrolyte materials in the vitreous state and the obtained sulfide-based inorganic solid electrolyte materials in the glass ceramic state was measured. The obtained results are shown in Table 1.

TABLE 1

| | Crystal Nucleating Agent | | Time of Mechanochemical Process (h) | Kind of Solid Electrolyte Material | Lithium Ionic Conductivity [S · cm$^{-1}$] | |
|---|---|---|---|---|---|---|
| | Kind | Content [mass %] | | | Vitreous State | Glass Ceramic State |
| Example 1 | $Li_{10}P_3S_{12}$ | 40 | 3 h (3 h × 1) | $Li_{10}P_3S_{12}$ | $1.44 \times 10^{-4}$ | $1.35 \times 10^{-3}$ |
| Example 2 | $Li_{10}P_3S_{12}$ | 30 | 3 h (3 h × 1) | $Li_{10}P_3S_{12}$ | $1.47 \times 10^{-4}$ | $1.36 \times 10^{-3}$ |
| Example 3 | $Li_{10}P_3S_{12}$ | 20 | 3 h (3 h × 1) | $Li_{10}P_3S_{12}$ | $1.35 \times 10^{-4}$ | $1.08 \times 10^{-3}$ |
| Example 4 | $Li_{10}P_3S_{12}$ | 10 | 3 h (3 h × 1) | $Li_{10}P_3S_{12}$ | $1.28 \times 10^{-4}$ | $0.64 \times 10^{-3}$ |
| Example 5 | $Li_{10}P_3S_{12}$ | 30 | 3 h (1.5 h × 2) | $Li_{10}P_3S_{12}$ | $1.51 \times 10^{-4}$ | $1.43 \times 10^{-3}$ |
| Compartive Example 1 | $Li_{10}P_3S_{12}$ | 0 | 3 h (3 h × 1) | $Li_{10}P_3S_{12}$ | $1.20 \times 10^{-4}$ | $0.53 \times 10^{-3}$ |
| Example 6 | $Li_{10}P_3S_{12}$ | 30 | 6 h (3 h × 2) | $Li_{10}P_3S_{12}$ | $2.67 \times 10^{-4}$ | $1.77 \times 10^{-3}$ |
| Example 7 | $Li_{10}P_3S_{12}$ | 30 | 12 h (6 h × 2) | $Li_{10}P_3S_{12}$ | $4.48 \times 10^{-4}$ | $1.91 \times 10^{-3}$ |
| Example 8 | $Li_{10}P_3S_{12}$ | 30 | 16 h (8 h × 2) | $Li_{10}P_3S_{12}$ | $4.59 \times 10^{-4}$ | $1.90 \times 10^{-3}$ |
| Example 9 | $Li_{10}P_3S_{12}$ | 30 | 30 h (15 h × 2) | $Li_{10}P_3S_{12}$ | $4.50 \times 10^{-4}$ | $1.40 \times 10^{-3}$ |
| Example 10 | $Li_3PS_4$ | 30 | 30 h (15 h × 2) | $Li_3PS_4$ | $3.61 \times 10^{-4}$ | $0.97 \times 10^{-3}$ |
| Compartive Example 2 | $Li_3PS_4$ | 0 | 30 h (15 h × 2) | $Li_3PS_4$ | $3.62 \times 10^{-4}$ | $0.12 \times 10^{-3}$ |
| Example 11 | $Li_3PS_4$ | 30 | 6 h (3 h × 2) | $Li_3PS_4$ | $3.24 \times 10^{-4}$ | $0.96 \times 10^{-3}$ |
| Compartive Example 3 | $Li_3PS_4$ | 0 | 6 h (3 h × 2) | $Li_3PS_4$ | $1.70 \times 10^{-4}$ | $0.57 \times 10^{-3}$ |

Examples 5 to 9

Sulfide-based inorganic solid electrolyte materials in the vitreous state and sulfide-based inorganic solid electrolyte materials ($Li_{10}P_3S_{12}$) in the glass ceramic state were prepared using the same method as that of Example 2, except that the time of the mechanochemical process by the planetary ball mill was changed as shown in Table 1. The lithium ionic conductivity of each of the obtained sulfide-based inorganic solid electrolyte materials in the vitreous state and the obtained sulfide-based inorganic solid electrolyte materials in the glass ceramic state was measured. The obtained results are shown in Table 1.

When the sulfide-based inorganic solid electrolyte materials are classified in terms of the kinds and are compared to each other in the time of the mechanochemical process, it can be understood that, with the method of manufacturing the sulfide-based inorganic solid electrolyte material according to Examples, the sulfide-based inorganic solid electrolyte material having a high ionic conductivity can be obtained within a short period of time.

Based on the above result, it can be understood that, with the method of manufacturing the sulfide-based inorganic solid electrolyte material according to the present embodiment, the inorganic composition can be vitrified within a shorter period of time, and the manufacturing time can be reduced.

The present application claims priority based on Japanese Patent Application No. 2019-066565 filed on Mar. 29, 2019, the entire content of which is incorporated herein by reference.

The invention claimed is:

1. A method of manufacturing a sulfide-based inorganic solid electrolyte material including Li, P, and S as constituent elements, the method comprising:
   a preparation step of preparing a raw material inorganic composition (A) including at least lithium sulfide, phosphorus sulfide, and a crystal nucleating agent; and
   a vitrification step of mechanically processing the raw material inorganic composition (A) to vitrify the raw material inorganic composition (A),
   wherein the crystal nucleating agent includes an inorganic solid electrolyte material; and
   wherein the crystal nucleating agent includes a sulfide-based inorganic solid electrolyte material including Li, P, and S as constituent elements.

2. The method of manufacturing a sulfide-based inorganic solid electrolyte material according to claim 1, wherein a molar ratio (Li/P) of a content of Li to a content of P in the sulfide-based inorganic solid electrolyte material as the crystal nucleating agent is 1.0 or higher and 10.0 or lower, and a molar ratio (S/P) of a content of S to the content of P in the sulfide-based inorganic solid electrolyte material as the crystal nucleating agent is 1.0 or higher and 10.0 or lower.

3. The method of manufacturing a sulfide-based inorganic solid electrolyte material according to claim 1,
   a content of the crystal nucleating agent in the raw material inorganic composition (A) is 5 mass % or higher and 60 mass % or lower.

4. The method of manufacturing a sulfide-based inorganic solid electrolyte material according to claim 1,
   wherein the mechanical process in the vitrification step includes a mechanochemical process.

5. The method of manufacturing a sulfide-based inorganic solid electrolyte material according to claim 1,
   wherein the mechanical process in the vitrification step is performed in a dry condition.

6. The method of manufacturing a sulfide-based inorganic solid electrolyte material according to claim 1, further comprising:
   a crystallization step of heating an inorganic composition (B) obtained after the vitrification step to crystallize at least a part of the inorganic composition (B).

* * * * *